United States Patent Office 2,793,345
Patented May 21, 1957

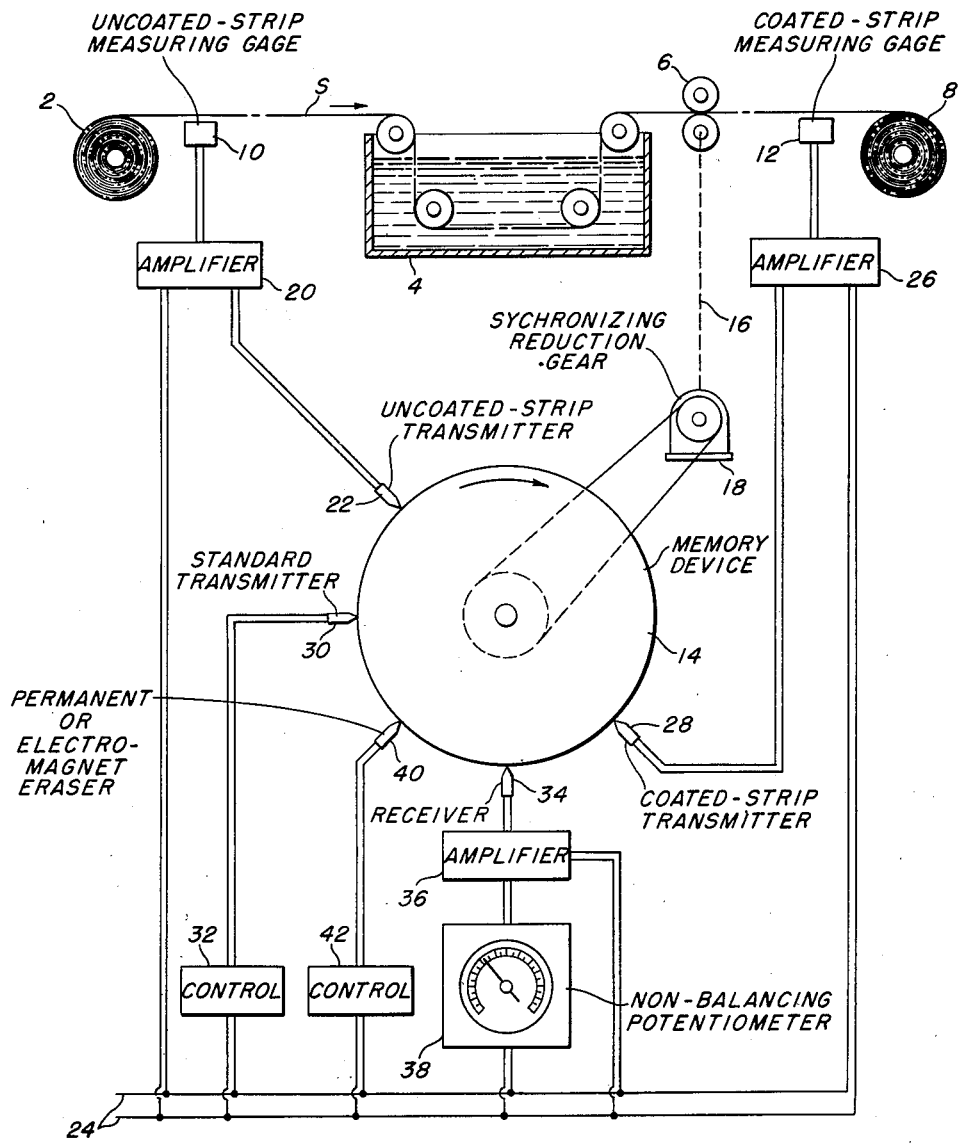

2,793,345

APPARATUS FOR MEASURING THE THICKNESS OF A COATING APPLIED TO A MOVING STRIP

Joseph W. Hags, Irwin, Pa., assignor to United States Steel Corporation, a corporation of New Jersey Application October 29, 1953, Serial No. 389,139

4 Claims. (Cl. 324—71)

This invention relates to apparatus for measuring the thickness of a coating applied to a moving strip and more particularly to apparatus for measuring the thickness of a zinc, lead, aluminum, paint, tin or other coating applied to a steel strip. In applying such a coating it is desired to know the exact thickness of he coating as it is being applied since this enables the operator to adjust the processing equipment to maintain the desired coating thickness. To accurately determine the thickness of the coating by the methods most commonly used it is necessary to cut a sample of standard area from the strip and chemically dissolve the coating. Such methods are destructive and time consuming so that in many instances the conditions existing at the time the sample is taken change before the coating thickness is determined. Other types of apparatus used to determine coating thickness also have various disadvantages and are not applicable to all types of coating. One problem present in determining the thickness of a coating on steel strip is to compensate for the normal variations in thickness of the strip from one section to another which is often greater than the thickness of the coating being applied. Thus, while thickness gages such as that shown in the patent to Rendel No. 2,474,117, dated June 21, 1949, could be used to continuously measure the thickness of a coated strip and subtracting the nominal thickness of the uncoated strip therefrom to determine the coating thickness such determination would be far from accurate.

It is therefore an object of my invention to provide apparatus which will continuously and accurately measure the thickness of a coating applied to a moving strip. This and other objects will be more apparent after referring to the following specification and attached drawings in which the single figure is a schematic view showing my device.

Referring more particularly to the drawings, the reference numeral 2 indicates an uncoiler from which strip S is unwound. The strip S passes from the uncoiler through a coating unit 4 and pinch rolls 6 to a coiler 8 where the strip is recoiled. Located adjacent the uncoiler 2 is a gage 10 which may be a beta ray gage of a standard type or a gage such as shown in the patent to Rendel mentioned above. A similar gage 12 is located adjacent the coiler 8. In many instances the strip passes through other processing equipment between the uncoiler 2 and coating unit 4 so that the distance between the gages 10 and 12 may be as great as several hundred feet. The conditions present in rolling steel strip are such that there is a definite variation in gage from one end of the strip to the other and in a distance of several hundred feet the variation in most instances would be thicker than the coating being applied. In order to take care of this difference in gage I provide a memory device 14 which is rotated at a speed proportional to that of the moving strip. As shown, this is done by providing a mechanical connection 16 between the pinch rolls 6 and the memory device 14. This connection is shown schematically and includes a synchronizing reduction gear unit 18. The memory device 14 is of the electronic-recording type-disc, drum, tape or wire. Such memory devices are in themselves well known. For example, the copending application to Camp et al., Serial No. 258,699, filed November 28, 1951, now Patent No. 2,735,987, dated February 21, 1956, and the patent to Reiber No. 2,424,633, dated July 29, 1947, disclose suitable memory devices. An electrical impulse proportional to the thickness of the uncoated strip is provided by the gage 10. This impulse is amplified in an amplifier 20 and relayed to a transmitter 22 adjacent the memory device 14 which translates the electrical voltage into a magnetic impulse and applies the same to the recording disc of the memory device. The amplifier 20 is provided with power from 110 volt A. C. supply lines 24. In like manner the gage 12 provides an electrical impulse proportional to the thickness of the coated strip which impulse is amplified by the amplifier 26 and delivered to a second transmitter 28 which translates the electrical voltage into a magnetic impulse and applies the same to the recording disc of the memory device. Voltage is applied to the amplifier 26 from power line 24. The memory device 14 rotates in the direction of the arrow and the distance between transmitters 22 and 28 is proportional to the length of strip between gages 10 and 12. The reduction gear 18 is such that the memory device will rotate the distance between transmitters 22 and 28 while the strip S is passing from the gage 10 to the gage 12. A transmitter 30 is provided for applying a standard magnetic impulse to the memory device 14. Power for the standard transmitter 30 is provided from power supply line 24 through a control 32 which reduces the voltage to magnetizing value. A receiver 34 is provided adjacent the transmitter 28. The receiver 34 translates any magnetic impulse on the disc of the memory device 14 and translates it into an electrical voltage proportional thereto. This voltage is amplified by amplifier 36 and applied to a thickness coating gage 38 which may be of the self-balancing potentiometer type. Power is applied to amplifier 36 and meter 38 from the power supply lines 24. A magnetism eraser 40 is provided adjacent the memory device 14 between the receiver 34 and transmitter 30. This eraser 40 may be either a permanent or electro-magnet. If electro-magnet it is provided with power from the supply lines 24 through a control 42.

The operation of the device is as follows:

As the strip S passes through the line it is continuously gaged by the gages 10 and 12. At the same time the memory device 14 is rotated at a speed proportional to line speed and a standard magnetic impulse is provided to the disc of the memory device 14 by means of the transmitter 30. This impulse provides a given level on which the magnetic impulse from the transmitter 22 is superimposed. A magnetic impulse from the transmitter 28 is superimposed on the magnetic impulses already on the memory device 14. However, this magnetic impulse is of opposite polarity to that already applied. The polarity can be reversed in many ways, such as by reversing the connections of the gage 12. The standard transmitter 30 may be omitted but is preferably provided in order to provide a base of a definite amount on which the subsequent magnetic impulses are applied. Since the time required for the memory device 14 to rotate the distance between the transmitters 22 and 28 is the same as the time required for the strip S to pass from the gage 10 to the gage 12 it will be seen that the impulse provided by the transmitter 28 will always be superimposed on the impulse provided by the transmitter 22 on the same increment of strip. Therefore, any variations in gage of the strip will not disturb the correct functioning of the device. Since the magnetic impulses are proportional to the strip thickness the coating meter 38 will always indicate the thickness of the coating applied to the strip. If the coating is applied to only one side of the strip this indication will be exact. If the coating is applied to both sides of the strip the meter 38 will be calibrated to indicate half the total thickness of both coatings.

While one embodiment of my invention has been shown and described it will be apparent that other adaptations and modifications may be made without departing from the scope of the following claims.

I claim:

1. Apparatus for measuring the thickness of a coating applied to a moving strip comprising a first means adjacent said strip for obtaining an electrical impulse proportional to the thickness of the uncoated strip, a second means remote from the first means adjacent said strip for obtaining an electrical impulse proportional to the thickness of the coated strip, means for subtracting said first impulse from said second impulse to obtain a net impulse proportional to coating thickness, means for delaying the impression of said first impulse to said last named means until that portion of the uncoated strip originally gaged reaches said second means, a meter, and means for impressing said net impulse on said meter.

2. Apparatus for measuring the thickness of a coating applied to a moving strip comprising a first means adjacent said strip for obtaining an electrical impulse proportional to the thickness of the uncoated strip, a second means remote from the first means adjacent said strip for obtaining an electrical impulse proportional to the thickness of the coated strip, a rotary memory device, means for rotating said memory device at a speed proportional to that of the strip, a transmitter for translating the electrical impulse from the first means into a corresponding magnetic impulse and applying it to said memory device, a transmitter for translating the electrical impulse from the second means into a corresponding magnetic impulse and superimposing the impulse on the first impulse, said last named impulse being opposite in polarity to the first impulse, said second transmitter being located from the first transmitter around said memory device in a distance proportional to the distance between said first two means so that an increment of strip will move from the first to the second means while a point on the memory device is rotating from the first to second transmitters, a receiver for receiving the net magnetic impulse and translating the same into an electrical voltage proportional thereto, a meter, and means for impressing said last named voltage on said meter.

3. Apparatus for measuring the thickness of a coating applied to a moving strip comprising a first means adjacent said strip for obtaining an electrical impulse proportional to the thickness of the uncoated strip, a second means remote from the first means adjacent said strip for obtaining an electrical impulse proportional to the thickness of the coated strip, a rotary memory device, means for rotating said memory device at a speed proportional to that of the strip, a transmitter for translating the electrical impulse from the first means into a corresponding magnetic impulse and applying it to said memory device, a transmitter for translating the electrical impulse from the second means into a corresponding magnetic impulse and superimposing the impulse on the first impulse, said last named impulse being opposite in polarity to the first impulse, said second transmitter being located from the first transmitter around said memory device in its direction of rotation a distance proportional to the distance between said first two means so that an increment of strip will move from the first to the second means while a point on the memory device is rotating from the first to the second transmitters, a receiver for receiving the net magnetic impulse and translating the same into an electrical voltage proportional thereto, a meter, means for impressing said last named voltage on said meter, and means located beyond said receiver in the direction of rotation of said memory device for erasing said magnetic impulses from said memory device.

4. Apparatus for measuring the thickness of a coating applied to a moving strip comprising a first means adjacent said strip for obtaining an electrical impulse proportional to the thickness of the uncoated strip, a second means remote from the first means adjacent said strip for obtaining an electrical impulse proportional to the thickness of the coated strip, a rotary memory device, means for rotating said memory device at a speed proportional to that of the strip, a first transmitter for applying a standard magnetic impulse to said memory device, a second transmitter for translating the electrical impulse from the first means into a corresponding magnetic impulse and superimposing the impulse on the standard impulse, a third transmitter for translating the electrical impulse from the second means into a corresponding magnetic impulse and superimposing the impulse on the first two impulses, said last named impulse being opposite in polarity to the second impulse, said third transmitter being located from the second transmitter around said memory device in its direction of rotation a distance proportional to the distance between said first two means so that an increment of strip will move from the first to the second means while a point on the memory device is rotating from the second to third transmitters, a receiver for receiving the net magnetic impulse and translating the same into an electrical voltage proportional thereto, a meter, means for impressing said last named voltage on said meter, and means located beyond said receiver in the direction of rotation of said memory device for erasing said magnetic impulses from said memory device.

References Cited in the file of this patent
UNITED STATES PATENTS

| | | |
|---|---|---|
| 1,163,678 | Messiter | Dec. 14, 1915 |
| 1,895,118 | Allen | Jan. 24, 1933 |
| 2,527,002 | Drake | Oct. 24, 1950 |